United States Patent
Asa et al.

(10) Patent No.: US 6,802,796 B2
(45) Date of Patent: Oct. 12, 2004

(54) CONTROL DEVICE FOR HYBRIDE-DRIVEN AUXILIARY SYSTEM

(75) Inventors: Hironori Asa, Okazaki (JP); Yasushi Suzuki, Chiryu (JP); Keiichi Uno, Kariya (JP)

(73) Assignees: Nippon Soken, Inc., Nishio (JP); Denso Corporation, Kariya (JP)

( * ) Notice: Subject to any disclaimer, the term of this patent is extended or adjusted under 35 U.S.C. 154(b) by 0 days.

(21) Appl. No.: 10/465,658

(22) Filed: Jun. 20, 2003

(65) Prior Publication Data

US 2004/0005954 A1 Jan. 8, 2004

(30) Foreign Application Priority Data

Jul. 4, 2002 (JP) .......................................... 2002-196055
Jun. 6, 2003 (JP) .......................................... 2003-162323

(51) Int. Cl.$^7$ ............................. B60K 6/02; B60K 41/12
(52) U.S. Cl. ............................................ 477/3; 477/37
(58) Field of Search .................. 477/2, 3, 37; 180/65.2, 180/65.4, 65.7; 701/54, 112

(56) References Cited

U.S. PATENT DOCUMENTS

| | | | | |
|---|---|---|---|---|
| 6,155,954 A | * | 12/2000 | Itoyama et al. ................. | 477/5 |
| 6,330,909 B1 | * | 12/2001 | Takahashi et al. .......... | 165/202 |
| 6,375,436 B1 | | 4/2002 | Irie et al. | |
| 6,480,767 B2 | * | 11/2002 | Yamaguchi et al. ....... | 180/65.2 |
| 6,622,697 B2 | * | 9/2003 | Oki et al. .............. | 123/339.14 |
| 6,656,082 B1 | * | 12/2003 | Yamada et al. ............ | 180/65.2 |
| 6,661,109 B2 | * | 12/2003 | Fukasaku et al. .......... | 180/65.1 |
| 6,687,582 B1 | * | 2/2004 | De La Salle et al. ......... | 701/22 |
| 6,742,350 B2 | * | 6/2004 | Suzuki et al. .................. | 62/230 |

FOREIGN PATENT DOCUMENTS

JP    A-2001-132634    5/2001

* cited by examiner

Primary Examiner—Sherry Estremsky
(74) Attorney, Agent, or Firm—Posz & Bethards, PLC

(57) ABSTRACT

A control device is provided in a hybrid-driven auxiliary system using an engine and a motor as driving force. The control device includes: an auxiliary unit into which the motor is integrally assembled; current controlling means for controlling an electric current of the motor for driving or generating; current detecting means for detecting the electric current of the motor; and load torque computing means for computing, based on the electric current of the motor, a load torque when the auxiliary unit is operated.

11 Claims, 5 Drawing Sheets

CONTROL DEVICE FOR HYBRIDE-DRIVEN AUXILIARY SYSTEM

CROSS REFERENCE TO RELATED APPLICATIONS

This application is based on and incorporates herein by reference Japanese Patent Applications No. 2002-196055 filed on Jul. 4, 2002, and No. 2003-162323 filed on Jun. 6, 2003.

FIELD OF THE INVENTION

The present invention relates to a control device for a hybrid-driven auxiliary system that is driven by an internal combustion engine and an electric motor and provided in a hybrid vehicle or an idling-stop vehicle. The control device is, in particular, suitable for controlling an engine or a transmission mounted in the hybrid vehicle.

BACKGROUND OF THE INVENTION

Recently, from the viewpoint of saving fuel cost, a hybrid vehicle or an idling-stop vehicle is brought to market. These vehicles stop their engines according to driving condition. Auxiliary units, such as a compressor provided in a refrigerating cycling device, which are driven by the engine, thereby require another drive. As a solution to this, for instance, JP-A-2000-130323 proposes a hybrid-driven auxiliary unit such as a hybrid-driven compressor, to which an electric motor is added as another drive.

Incidentally, operation of an auxiliary unit is controlled by directly detecting its load torque during the operation. This enables response or stability of operational characteristic to be enhanced, so that desired torque or output of the engine can be easily obtained. This results in eliminating waste of consumption energy of the engine.

One of technologies for directly detecting the load torque is described in JP-A-2001-132634. The technology is directed to a compressor. Here, a load torque detector disposed in a pulley detects, as the load torque, pulley's mechanical distortion derived from torsion of a driving shaft.

However, the above technology involves providing of the dedicated load torque detector, so that cost is increased.

SUMMARY OF THE INVENTION

It is an object of the present invention to provide a control device that is provided in a hybrid-driven auxiliary system and able to compute a load torque without a dedicated load torque detector.

To achieve the above object, a control device in a hybrid-driven auxiliary system using an engine and a motor for driving force is provided with the following. An auxiliary unit is provided as being operated with the engine or the motor that is integrally assembled into the auxiliary unit. A first or second electric current is controlled and detected, wherein the first is to be supplied to the motor while the motor is used as the driving force. The second is to be generated by the motor while the engine is used as the driving force. A load torque while the auxiliary unit is operated is computed based on the detected electric current.

This structure enables, without dedicatedly providing a load torque detector, the load torque for operating the hybrid-driven auxiliary unit to be computed from the electric current of the motor. The engine can be thereby controlled based on the computed load torque.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

First Embodiment

A control device of a hybrid-driven auxiliary system according to a first embodiment of the present invention will be explained with referring to FIGS. 1 to 5.

Figure 1:
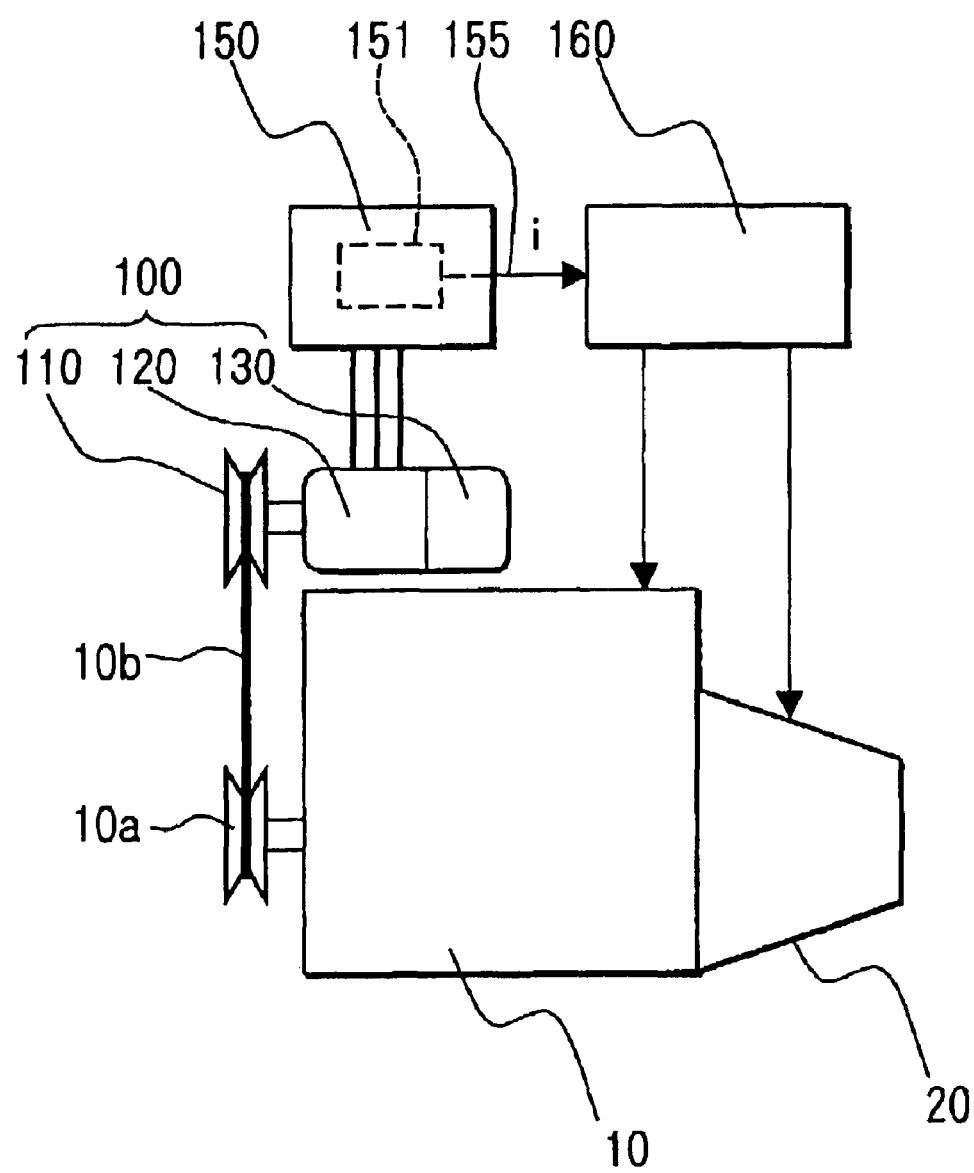
FIG. 1 is a schematic diagram showing overall structure of a hybrid-driven auxiliary system according to a first embodiment of the present invention.
Figure 2:
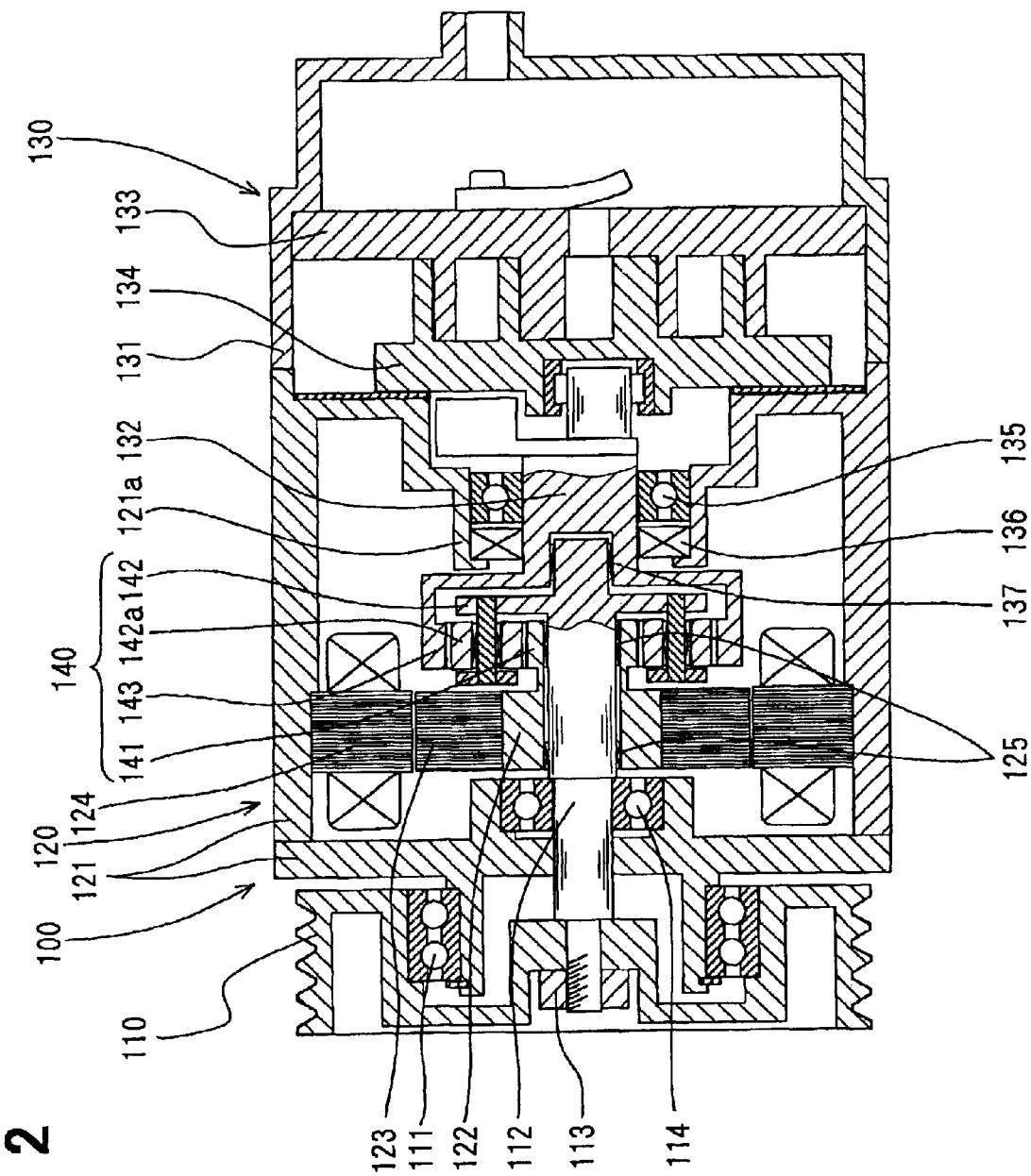
FIG. 2 is a sectional view of a hybrid compressor shown in FIG. 1.

The control device of the hybrid-driven auxiliary system is applied to a so-called "idling-stop vehicle" whose engine 10 is stopped while a vehicle is in temporary stop during the driving. Overall structure of the hybrid-driven auxiliary system is shown in FIG. 1. The control device includes, as a basis, a hybrid-driven auxiliary unit 100 and an inverter 150 having an electric current detecting unit 151. The control device further includes, a harness 155 and an engine electronic control unit (ECU) 160, which is associated with the inverter 150 and the hybrid-driven auxiliary unit 100. Incidentally, an engine 10 is connected with a transmission 20 that changes revolution number of the engine 10 in a stepless manner (not stepwise).

The hybrid-driven auxiliary unit 100 is a hybrid compressor 100 includes, as a basis, a compressor 130 provided in a refrigerating cycling device (not shown), and an integrated motor 120. Details will be explained with referring to FIG. 2.

The hybrid compressor 100 includes a pulley 110, the motor 120, the compressor 130, and a planetary gear 140 as a speed-changing mechanism. The planetary gear 140 is for changing driving revolution numbers of the pulley 110 and motor 120 to transmit to the compressor 130. The planetary gear 140 includes: a sun gear unit 141 centrally positioned; pinion gear units 142a revolving around the sun gear unit 141 along with rotating on their own axes; a planetary carrier unit 142 connected with the pinion gear units 142a; and a ring-shaped ring gear unit 143 surrounding the pinion gear units 142a.

The pulley 110 is rotatably supported by a pulley bearing 111 that is fixed to a motor housing 121. The pulley 110a is rotatably driven by driving force from a crank pulley 10a of the engine 10 through a belt 10b, as shown in FIG. 1. A pulley-driving shaft 112, whose one end is fixed in a center of the pulley 110 with a nut 113, is rotatably supported by a bearing 114. The pulley-driving shaft 112 is thereby rotated along with the pulley 110. The pulley-driving shaft 112 is connected, at the other end, with the planetary carrier unit 142 of the planetary gear 140.

The motor 120 includes: a motor shaft 122; a rotor portion 123 fixed to the motor shaft 122; and a stator portion 124. The motor 120 is contained, along with the planetary gear 140, within the motor housing 121. The motor shaft 122 is connected with the sun gear unit 141 of the planetary gear 140. The motor shaft 122 and the sun gear unit 141 are supported by the bearings 125 with being rotatable relative to the pulley-driving shaft 112. The stator portion 124 is fitly pressed to be fixed in an inner surface of the motor housing 121. The stator portion 124 is provided with an electric power through the after-mentioned inverter 150 from an outside power source (not shown), so that the rotor portion 123 is rotated along with the motor shaft 122 and the sun gear unit 141. When the driving force of the pulley-driving shaft 112 is transmitted through the planetary gear 140, the motor 120 operates as a generator and outputs electric power to the inverter 10.

The compressor 130 is a fixed displacement type, whose discharging volume per a cycle is set at a predetermined value. In detail, the compressor 130 is a known scroll type that has a fixed scroll 133 and a movable scroll 134 within a compressor housing 131. The movable scroll 134 revolves due to a compressor shaft (eccentric shaft) 132. Engagement between the fixed and movable scrolls 133, 134 leads to forming an operational chamber for suctioning, compressing, and discharging a refrigerant within the refrigerating cycling device.

The compressor shaft 132 is rotatably supported by a bearing 135 fixed to a protruding wall 121a protruding to the motor housing 121. The compressor shaft 132 is connected, at an end opposite to an end close to the scrolls 134, with the ring gear unit 143 of the planetary gear 140. A bearing 137 is disposed between the pulley-driving shaft 112 and the compressor shaft 132, so that both shafts 112, 132 are supported by the bearing 137 with being rotatable separately with each other. Furthermore, a sealing member 136 is disposed between the protruding wall 121a and the compressor shaft 132, towards the motor 120 from the bearing 135, for inhibiting the refrigerant within the compressor 130 from leaking to the motor 120.

Returning to FIG. 1, the inverter 150 includes the electric current detecting unit 151 for detecting electric current of the motor 120. The inverter 150 is furthermore for operating the motor 120 through controlling an electric current supplied to the motor 120 or an electric current from the motor 120 when the motor 120 operates as the generator. The inverter 150 detects, while the motor 120 is operating, an electric current i to output to the engine ECU 160 through a harness 155 as a transmitting means.

The engine ECU 160 is for controlling the engine 10 and the transmission 20. The engine ECU 160 computes a primary engine output Po (output for vehicle driving excluding output for the hybrid compressor 100) with using factors of throttle opening ratio, fuel injection amount, engine revolution number, and the like. The engine ECU 160 thereby controls the most suitable operation of the engine 10 with changing revolution number via the transmission 20. To attain the most suitable operation, storage (ROM) built within the engine ECU 160 is previously stored with data shown in FIGS. 3, 4 and an after-mentioned arithmetic expression (Formula 1).

Figure 3:
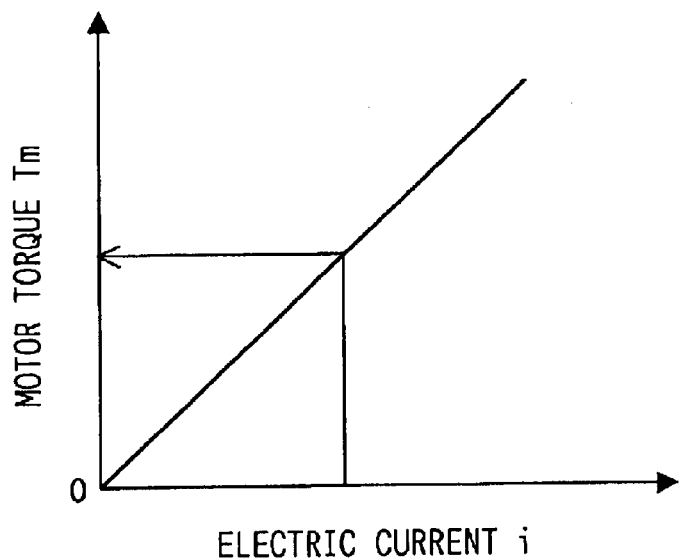
FIG. 3 is a graph showing relationship between motor torque and motor electric current.

In FIG. 3, a motor torque Tm is associated with an electric current i of the motor 120. The motor torque Tm can be computed based on the electric current i obtained from the electric current detecting unit 151.

Figure 4:
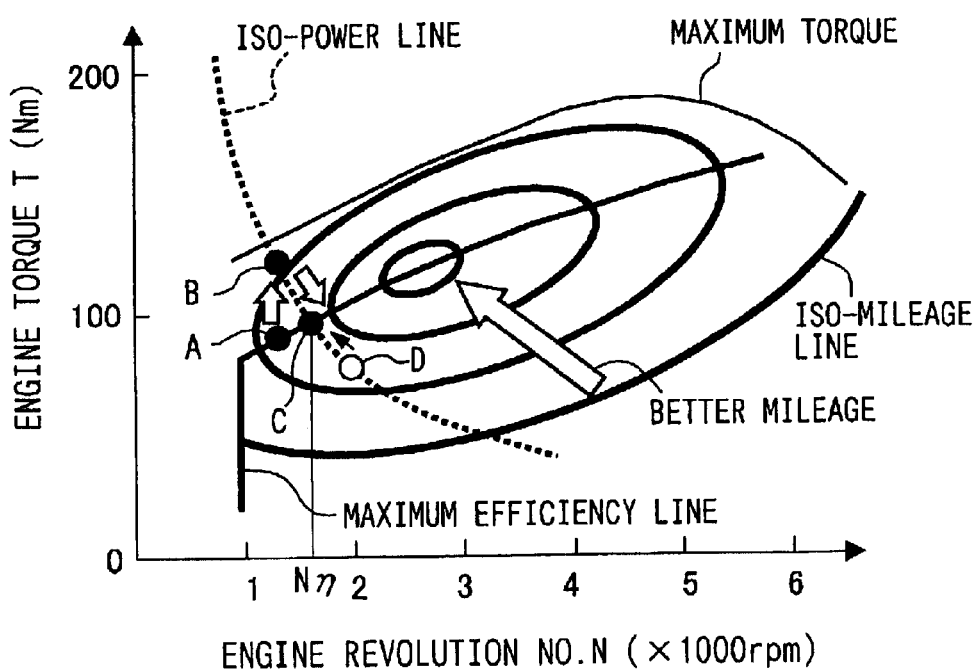
FIG. 4 is a diagram showing iso-power line, maximum operational efficiency line, iso-mileage line, and maximum torque on coordinates of engine torque and engine revolution number.

In FIG. 4, an iso-power line and a maximum operational efficiency line are shown on coordinates of an engine revolution number N and an engine torque T that is an output torque of the engine 10. The iso-power line is a hyperbola along which the engine output Po that is the product of the engine torque T and the engine revolution number N is constant. In FIG. 4, although the iso-power line is described as a representative instance, countless numbers of lines exist.

The maximum operational efficiency line has a characteristic advancing to upper right-hand corner of the coordinates. When the engine 10 is operated under the same engine output power Po, Point C intersecting between the maximum operational efficiency line and the iso-power line is determined as the maximum operational efficiency point under the engine output Po. From Point C, an engine revolution number Nη of this condition is thereby computed. Here, along the maximum operational efficiency line, the best fuel efficiency point is existing in a predetermined range of the engine revolution number N. Naturally, operation of the engine 10 can be controlled in a region less than the maximum torque.

A load torque Te relative to the engine 10, while the hybrid compressor 100 is operated, is computed with using the motor torque Tm obtained from FIG. 3 as following Formula 1.

$$Te=(1+\alpha) \times ip \times TM \quad \text{(Formula 1)}$$

α: gear ratio of the ring gear unit 143 relative to the sun gear unit 141 in the planetary gear 140, ip: pulley ratio of the crank pulley 10a relative to the pulley 110.

Formula 1 is deduced from Formulae 2 to 4 as follows.

$$Tp=Tm+Tc \quad \text{(Formula 2)}$$

Tp: pulley torque

Tm: motor torque

Tc: compressor torque

These are torques of the respective shafts 112, 122, 132 that are connected with the planetary gear 140.

$$Te=ip \times Tp \quad \text{(Formula 3)}$$

Relationship between the load torque Te and the pulley torque Tp is described using the pulley ratio ip.

$$Tc=\alpha \times Tm \quad \text{(Formula 4)}$$

Relationship between the compressor torque Tc and the motor torque Tm is described using the gear ratio α of the planetary gear 140.

In the next place, operation based on the above structure will be explained below.

The hybrid compressor 100 is operated by driving force of the engine 10 and the motor 120. At a cooling down stage where capacity of a compressor is highly required, the driving force of the crank pulley 10a or engine 10 is transmitted to the compressor shaft 132 of the compressor 130 through the pulley-driving shaft 112 of the pulley 110 and the planetary gear 140. The compressor 130 is thereby operated. Here, the inverter 150 controls the motor 120 for rotating in the opposite direction relative to that of the pulley 110. The compressor 130 thereby increases revolution number and a discharging amount.

At a usual cooling stage posterior to the cooling down stage, the compressor 130 is driven mainly by the driving force of the pulley 110. Here, the compressor 130 executing compressing workload, so that operational torque of the compressor 130 is greater, by the compressing workload, than that of the motor 120. Relative to the pulley 110, the motor 120 operates in higher revolution number and the compressor 130 operates in lower revolution number. As a result, the motor 120 operates as the generator, and the inverter 150 thereby recharges a battery (not shown). When the motor 120 is controlled for decreasing its revolution number, the revolution number of the compressor 130 is increased. The discharging amount of the compressor 130 can be thereby adjusted.

Furthermore, when the engine 10 stops, the compressor 130 is driven by the motor 120. Here, the inverter 150 controls the motor 120 for rotating in the reverse direction, so that the driving force of the motor 120 is transmitted to the compressor 130. The revolution number of the compressor 130 is increased or decreased by increasing or decreasing the revolution number of the motor 120, respectively. The discharging amount of the compressor 130 can be thereby adjusted.

Thus, when the hybrid compressor 100 is operated, the load torque Te relative to the engine 10 is computed from the electric current i of the motor 120 mainly by the engine ECU 160. Based on the computed load torque Te, the engine 10 and the transmission 20 are controlled for attaining the most proper mileage.

The control for the engine 10 and the transmission 20 will be explained below with referring to FIG. 5.

At Step 100, it is determined whether this hybrid-driven auxiliary system is in an operating state, by checking presence or absence of electric current i of the motor 120. When the system is determined to be in the operating state, an electric current i of the motor 120 is detected by the electric current detecting unit 151 at Step 101. When the system is determined to be not in the operating state, processing is terminated with maintaining the present state.

At Step 102, a load torque Te is computed. Here, a motor torque Tm is computed from the electric current i detected at Step 101 by using the relationship shown in FIG. 3, and a load torque Te is computed from the computed motor torque Tm by using Formula 1.

At Step 103, a total output P of the engine 10 is computed. Namely, the total output P is obtained by adding, into a primary engine output Po, an auxiliary output Ph. The auxiliary output Ph corresponds to the above load torque Te, and is the product of the load torque Te and the engine revolution number N.

At Step 104, the engine 10 is controlled for operating so that the total output P can be attained.

At Step 105A, furthermore, the engine revolution number N is changed via the transmission 20 (a speed-change ratio of the transmission 20 is changed).

At Step 105, a target engine revolution number Nη, where the iso-power line and the maximum operational efficiency line intersect in the relationship shown in FIG. 4, and a present engine revolution N are compared with each other. The target engine revolution number Nη is designated at Point C shown in FIG. 4. The present engine revolution N is designated at Point B shown in FIG. 4. Point B is moved, by a portion corresponding to the load torque Te, from Point A.

When the target engine revolution number Nη is determined to be greater than the present engine revolution number N, the speed-change ratio of the transmission 20 is increased at Step 106. Here, the speed-change is defined as a ratio of a revolution number of input shaft of the transmission 20 relative to a revolution number of an output shaft of the transmission 20. The speed-change increases with increasing engine revolution number N. At Step 107, it is determined whether the present engine revolution number N coincides with the target engine revolution number Nη. When the present engine revolution number N does not coincide with the target engine revolution number Nη, the processing repeats to Steps 106 and then 107. When the target engine revolution number Nη is determined to coincide with the present engine revolution number N, the processing is terminated.

By contrast, when the target engine revolution number Nη is determined to be smaller than the present engine revolution number N, the speed-change of the transmission 20 is decreased at Step 108. At Step 109, it is determined whether the present engine revolution number N coincides with the target engine revolution number Nη. When the present engine revolution number N does not coincide with the target engine revolution number Nη, the processing repeats to Steps 108 and then 109. When the target engine revolution number Nη is determined to coincide with the present engine revolution number N, the processing is terminated.

Figure 5:
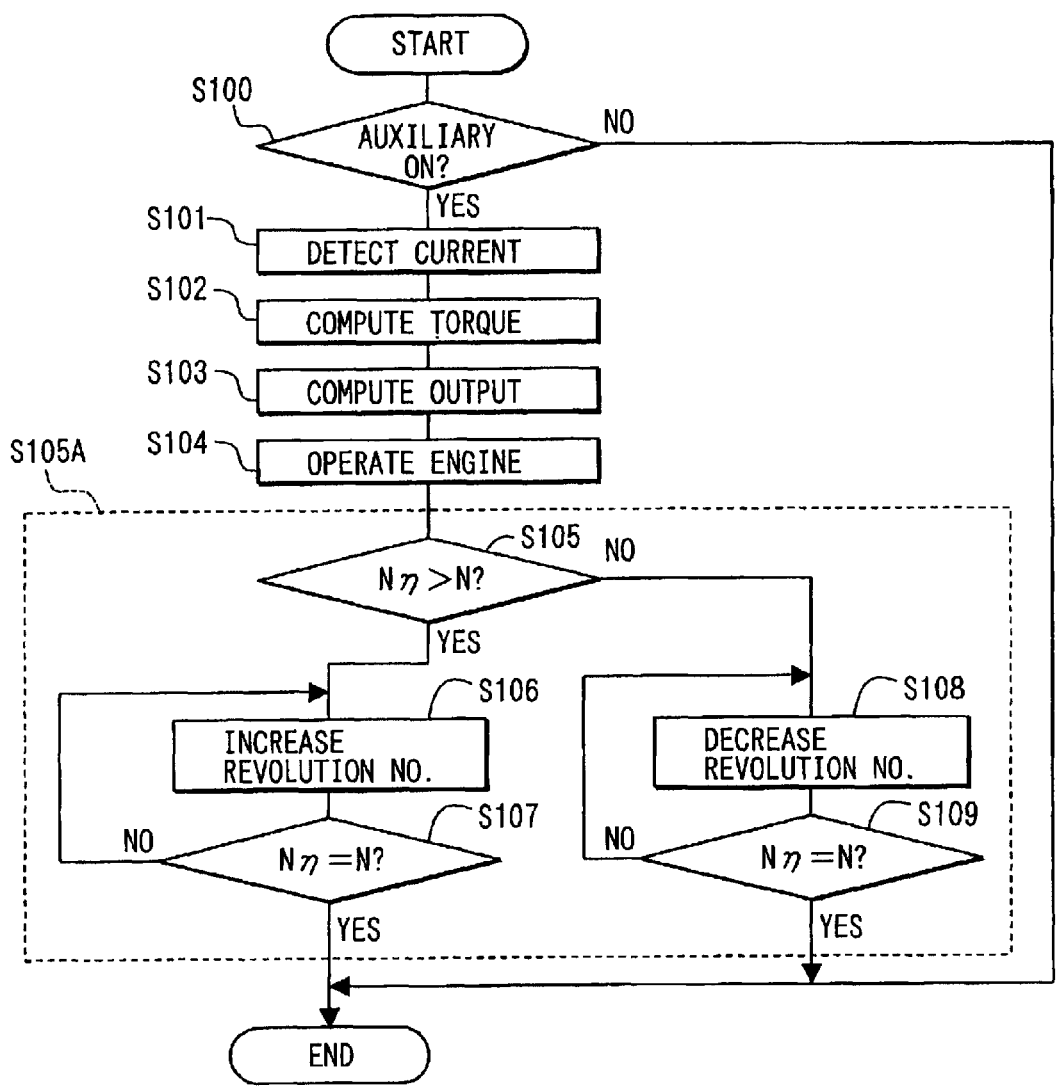
FIG. 5 is a flow chart diagram explaining processing of controlling an engine and transmission.

Naturally, at Step 105, when the target engine revolution number Nη is determined to coincide with the present engine revolution number N, the processing is also terminated (not shown in FIG. 5).

In a state where the target engine revolution number Nη is determined to be equal to the present engine revolution number N, the engine 10 at the engine output P is assumed to be operated at the best fuel efficiency.

In the above explained embodiment, without dedicatedly providing a load torque detector, the load torque Te for operating the hybrid compressor 100 can be computed from the electric current i of the motor 120. The engine 10 can be controlled based on the computed load torque Te.

Furthermore, while the engine 10 is operating, the transmission 20 is controlled so that the target engine revolution number Nη can be attained. This results in enhancing the fuel efficiency along with maintaining the total output P of the engine 10.

Furthermore, the planetary gear 140 is provided, as a speed-changing mechanism, among the pulley-driving shaft 112, the motor shaft 122, and the compressor shaft 132 in the hybrid compressor 100, so that revolution numbers of the engine 10 and motor 120 are variably transmitted to the compressor 130. This results in dispensing with a variable displacement mechanism in the compressor 130 and thereby reducing cost of the compressor 130. Discharging amount is increased with increasing revolution number, so that the compressor 130 can be downsized.

Furthermore, the pulley-driving shaft 112 is connected with the planetary carrier unit 142, the motor shaft 122 is connected with the sun gear unit 141, and the compressor shaft 132 is connected with the ring gear unit 143. A deceleration ratio from the motor 120 to the compressor 130 can be thereby in a wide range. The motor 130 can be of a high revolution number and low torque, so that the motor 130 can be downsized.

Second Embodiment

Figure 6:
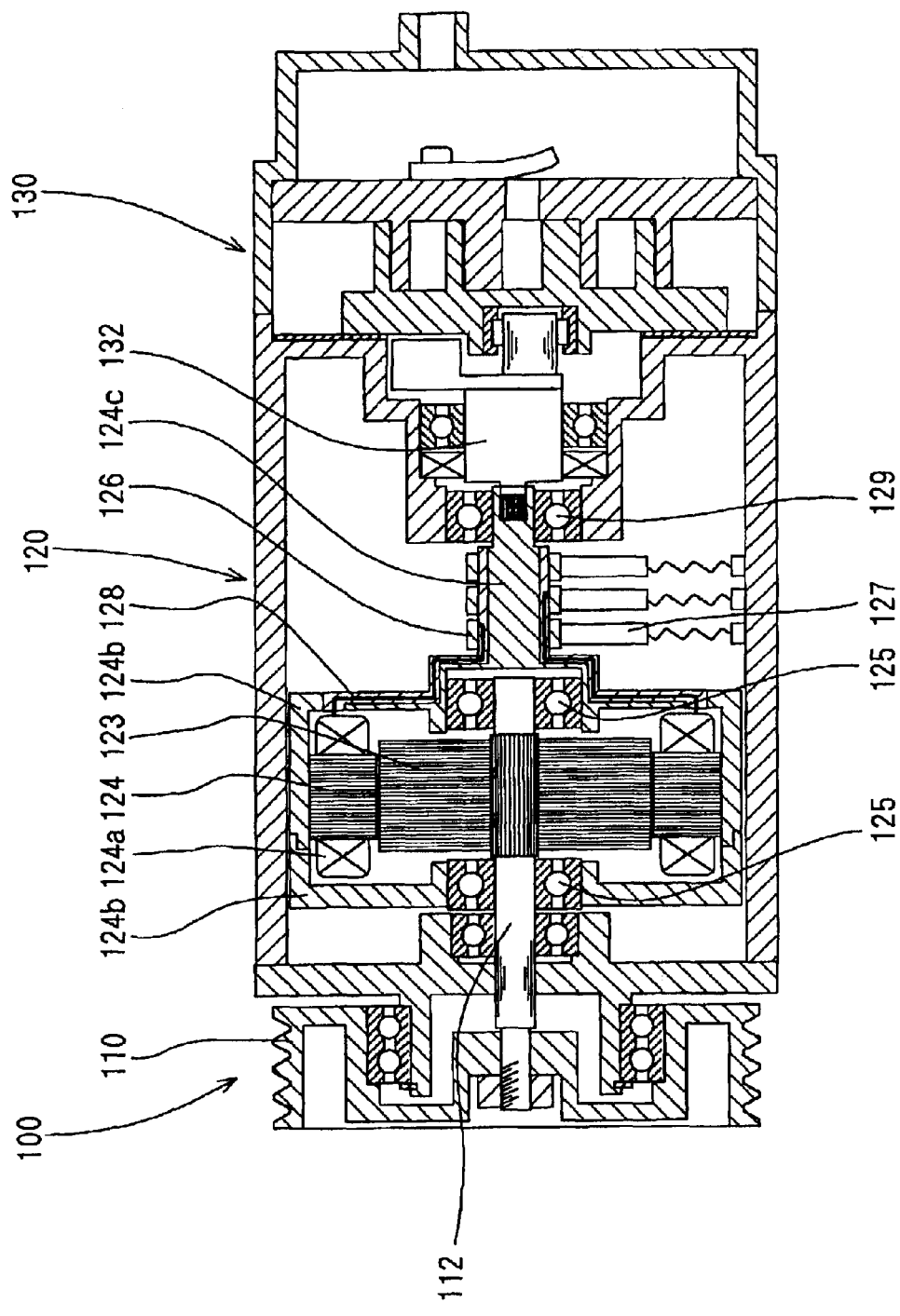
FIG. 6 is a sectional view of a hybrid compressor according to a second embodiment of the present invention.

In a second embodiment shown in FIG. 6, a reciprocal motor 130 is adopted differently from the first embodiment.

A rotor portion 123 is fixed to a pulley-driving shaft 112 and thereby rotated along with the pulley-driving shaft 112. By contrast, a stator portion 124 includes a wire-winding portion 124a, and is fixed along an inner surface of a stator housing 124b. Along a center axis of the stator housing 124b, a stator shaft 124c extends towards a compressor 130 and is connected with a compressor shaft 132. The stator shaft 124c is rotatably supported by a bearing 129. The stator housing 124b is supported by bearings 125 with being rotatable relative to the pulley-driving shaft 112. The rotor portion 123 and the stator portion 124 are rotatable independently from each other.

An electric wire 128 extending from the wire-winding portion 124a is connected with a slip ring 126. The slip ring 126 fitly contacts with a brush 127 and is electrically connected with the inverter 150.

In the reciprocal motor 120, a pulley torque Tp is equal to a motor torque Tm. A load torque Te is computed using following Formula 5 that is stored as an arithmetic expression in the engine ECU 160.

$$Te = ip \times Tm \quad \text{(Formula 5)}$$

In detail, control of a hybrid-driven auxiliary system is the same as that of first embodiment (FIG. 5), so that the most suitable operational control of the engine 10 and mileage is enhanced.

In the reciprocal motor 120, relative speed between the rotor portion 123 and the stator portion 124 is varied by adjusting a supplied electric current i, so that a revolution number of the compressor 130 is increased or decreased. This results in dispensing with the planetary gear 140 as the speed-changing mechanism in the first embodiment.

The stator portion 124 includes the wire-winding portion 124a, the rotor portion 123 is connected with the pulley-driving shaft 112, and the stator portion 12 is connected with the compressor 130. Inertia around the rotor portion 123 is thereby decreased. This enables load of the engine 10 at starting stage to be reduced.

Modification

The first and second embodiments can be modified below.

The load torque and the engine output are computed by the engine ECU 160. However, a computing function can be added to the inverter 150, so that the inverter 150 can compute them and output a computed result such as a load torque Te to the engine ECU 160.

The harness 155 transmits the electric current i or the load torque Te to the ECU 160. However, the harness can be replaced with a wireless method, an optical cable, or the like.

The compressor 130 that is provided in the refrigerating cycling device is explained as a target auxiliary unit. However, a pump for a power steering, a water pump for a radiator, or the like can be a target auxiliary unit.

The idling-stop vehicle is explained as a target vehicle. However, a hybrid vehicle can be naturally a target vehicle.

It will be obvious to those skilled in the art that various changes may be made in the above-described embodiments of the present invention. However, the scope of the present invention should be determined by the following claims.

What is claimed is:

1. A control device in a hybrid-driven auxiliary system using at least one of an engine and a motor as driving force, the control device comprising:
   an auxiliary unit which is operated with at least one of the engine and the motor, wherein the motor is integrally assembled into the auxiliary unit;
   current controlling means for controlling one of two electric currents of a first electric current and a second electric current, wherein the first electric current is to be supplied to the motor while the motor is used as the driving force, wherein the second electric current is to be generated by the motor while the engine is used as the driving force;
   current detecting means for detecting one of the two electric currents controlled by the current controlling means; and
   load torque computing means for computing, based on the electric current detected by the current detecting means, a load torque when the auxiliary unit is operated.

2. The control device according to claim 1, further comprising:
   engine controlling means for controlling the engine; and
   transmitting means for transmitting at least one of the electric current detected by the current detecting means and the load torque computed by the load torque computing means to the engine controlling means.

3. The control device according to claim 2,
   wherein the engine controlling means controls an output torque of the engine based on at least one of the electric current and the load torque transmitted by the transmitting means.

4. The control device according to claim 2,
   wherein one of the current controlling means and the engine controlling means includes:
   engine output computing means for computing a total output of the engine that includes an auxiliary output corresponding to the load torque computed by the load torque computing means; and
   engine operating means for executing an operation of the engine at the total output computed by the engine output computing means.

5. The control device according to claim 4,
   wherein the engine includes a transmission that changes an operational revolution number of the engine in a stepless manner, and
   wherein one of the current controlling means and the engine controlling means includes engine revolution changing means for changing, while engine operating means is executing the operation of the engine, a revolution number of the engine via the transmission so that a maximum efficiency at the total output is obtained.

6. The control device according to claim 1,
   wherein the auxiliary unit includes a compressor for compressing a refrigerant within a refrigerating cycling device, and
   wherein a planetary gear is provided among a given shaft through which the driving force of the engine is transmitted, a motor shaft of the motor, and a compressor shaft of the compressor.

7. The control device according to claim 6,
   wherein the given shaft is connected with a planetary carrier unit of the planetary gear,
   wherein the motor shaft is connected with a sun gear unit of the planetary gear, and
   wherein the compressor shaft is connected with a ring gear unit of the planetary gear.

8. The control device according to claim 1,
   wherein the auxiliary unit includes a compressor for compressing a refrigerant within a refrigerating cycling device, and
   wherein the motor is a reciprocal motor in which a rotor portion and a stator portion are able to be rotated independently from each other.

9. The control device according to claim 8, wherein the stator portion includes a wire-winding portion, wherein a given shaft, through which the driving force of the engine is transmitted, is connected with the rotor portion, and wherein the stator portion is connected with the compressor.

10. A controlling method in a hybrid-driven auxiliary system operating, by using at least one of an engine and a motor as driving source, an auxiliary unit into which the motor is integrally assembled, the controlling method comprising steps of:

controlling one of two electric currents of a first electric current and a second electric current, wherein the first electric current is to be supplied to the motor while the motor is used as the driving force, wherein the second electric current is to be generated by the motor while the engine is used as the driving force;

detecting the one of the two electric currents during the controlling; and computing, based on the detected electric current, a load torque when the auxiliary unit is operated.

11. A computer program including a controlling method in a hybrid-driven auxiliary system that operates, by using at least one of an engine and a motor as driving force, an auxiliary unit into which the motor is integrally assembled, the computer program comprising steps of:

controlling one of two electric currents of a first electric current and a second electric current, wherein the first electric current is to be supplied to the motor while the motor is used as the driving source, wherein the second electric current is to be generated by the motor while the engine is used as the driving force;

detecting the one of the two electric currents during the controlling; and computing, based on the detected electric current, a load torque when the auxiliary unit is operated.

* * * * *